(12) United States Patent
Tchertkov et al.

(10) Patent No.: US 9,322,701 B2
(45) Date of Patent: Apr. 26, 2016

(54) DYNAMIC FORCE SENSING TO DETERMINE MASS USING A SMARTPHONE

(71) Applicant: QUALCOMM Incorporated, San Diego, CA (US)

(72) Inventors: Igor Tchertkov, San Jose, CA (US); Siddika Parlak Polatkan, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 13/958,287

(22) Filed: Aug. 2, 2013

(65) Prior Publication Data

US 2015/0034396 A1    Feb. 5, 2015

(51) Int. Cl.

| | |
|---|---|
| *G01G 23/01* | (2006.01) |
| *G01G 9/00* | (2006.01) |
| *G01G 19/56* | (2006.01) |
| *G01H 17/00* | (2006.01) |
| *G01G 23/16* | (2006.01) |
| *G01P 15/14* | (2013.01) |
| *G01G 3/16* | (2006.01) |
| *H04M 1/725* | (2006.01) |

(Continued)

(52) U.S. Cl.
CPC .............. *G01G 23/166* (2013.01); *G01G 3/16* (2013.01); *G01G 9/00* (2013.01); *G01H 17/00* (2013.01); *G01P 15/14* (2013.01); *H04M 1/72522* (2013.01); *G01G 21/22* (2013.01); *G01G 21/283* (2013.01); *G01G 23/01* (2013.01); *H04M 2250/12* (2013.01)

(58) Field of Classification Search
CPC .. E21B 47/0002; G01N 21/954; G01G 21/22; G01G 21/283; G01G 23/166; G01G 3/16; G01G 9/00; G01H 17/00; G01P 15/14; H04M 1/72522; H04M 2250/12
USPC ....... 73/152, 1.13, 32 A, 32 R, 864; 382/109; 175/50; 702/6; 177/2–5, 9, 11–26, 264
See application file for complete search history.

(56) References Cited

U.S. PATENT DOCUMENTS

| | | |
|---|---|---|
| 7,140,255 B2 | 11/2006 | Ohsugi et al. |
| 7,168,289 B2 | 1/2007 | Kikuchi |

(Continued)

FOREIGN PATENT DOCUMENTS

| | | |
|---|---|---|
| EP | 0674158 A2 | 9/1995 |
| EP | 1403627 A1 | 3/2004 |
| GB | 2427979 A | 1/2007 |

OTHER PUBLICATIONS

Partial International Search Report—PCT/US2014/045474—ISA/EPO—Sep. 17, 2014.

(Continued)

*Primary Examiner* — Hezron E Williams
*Assistant Examiner* — Gedeon M Kidanu
(74) *Attorney, Agent, or Firm* — Silicon Valley Patent Group LLP

(57) ABSTRACT

Systems, apparatus and methods for estimating a mass of an object by a mobile device are presented. The mobile device, which may be a smartphone, vibrates the mobile device both unloaded (without an object) and loaded (with an object) while measuring the unloaded and loaded vibrations. Next, the mobile device compares the unloaded and loaded vibrations and determines the mass of the object from the comparison.

30 Claims, 7 Drawing Sheets

(51) Int. Cl.
*G01G 21/22* (2006.01)
*G01G 21/28* (2006.01)

(56) References Cited

U.S. PATENT DOCUMENTS

| | | | |
|---|---|---|---|
| 7,216,543 B2 | 5/2007 | Paik et al. | |
| 7,921,673 B2 | 4/2011 | Ruzzier et al. | |
| 2005/0016301 A1* | 1/2005 | Elnatan | G01G 3/16 73/865 |
| 2006/0015268 A1* | 1/2006 | Paik | G01G 3/13 702/50 |
| 2012/0181091 A1* | 7/2012 | Lieu | G06Q 30/06 177/1 |
| 2012/0222905 A1* | 9/2012 | Huang | G01G 19/52 177/210 R |
| 2014/0089231 A1* | 3/2014 | Jhunja | G01G 7/06 705/407 |
| 2014/0224551 A1* | 8/2014 | Turner | G01G 5/006 177/1 |
| 2015/0168205 A1* | 6/2015 | Lee | G01L 1/26 177/1 |

OTHER PUBLICATIONS

International Search Report and Written Opinion—PCT/US2014/045474—ISA/EPO—Jan. 15, 2015.

* cited by examiner

Tare $MV_0 = mv_0$ $MA_0 = ma_0$ $$(M+m)\ddot{x}+c\dot{x}+kx=(M+m)g+mr\omega^2\cdot\sin(\omega t)$$

Inertial force
dampening
Hook's elasticity
gravitation
Driving force

DYNAMIC FORCE SENSING TO DETERMINE MASS USING A SMARTPHONE

CROSS-REFERENCE TO RELATED APPLICATIONS

This is the first application filed for the present technology.

BACKGROUND

I. Field of the Invention

This disclosure relates generally to systems, apparatus and methods for determining a mass, and more particularly to determining a mass of an object by applying vibrations and measuring accelerations with a smartphone.

II. Background

To determine a weight of an object, scales typically measure static force applied by the object to a static force sensor. For example a bathroom scale typically measures a person's weight using four static force sensor. The force on the four sensors is summed to result in the total weight of the person. Often small weights (e.g., up to 11 pounds with a one-ounce resolution) are measured with a tabletop-sized force sensor. A disadvantage is that the tabletop scale must be close by when needed. Weighing an object with a more readably available device, such as a smartphone, is desirable when not near a dedicated scale.

BRIEF SUMMARY

Disclosed are systems, apparatus and methods for estimating a mass of an object by a mobile device. The mobile device vibrates the mobile device both unloaded and loaded with an object and measures both the unloaded and loaded vibrations. Next, the mobile device compares the unloaded and loaded vibrations to determine the mass of the object 200.

According to some aspects, disclosed is a method in a mobile device for estimating a mass, the method comprising: vibrating the mobile device loaded with an object; measuring a loaded vibration of the mobile device and the object comprising determining linear acceleration from an accelerometer, wherein the mobile device comprises the accelerometer; comparing a tare vibration to the loaded vibration to result in a comparison, wherein the tare vibration comprises a measurement of a vibration of the mobile device unloaded with the object; and determining the mass of the object from the comparison.

According to some aspects, disclosed is a method in a mobile device for estimating a mass, the method comprising: vibrating the mobile device loaded with an object; measuring a loaded vibration of the mobile device and the object comprising determining an angular acceleration from a gyroscope, wherein the mobile device further comprises the gyroscope; comparing a tare vibration to the loaded vibration to result in a comparison, wherein the tare vibration comprises a measurement of a vibration of the mobile device unloaded with the object; and determining the mass of the object from the comparison.

According to some aspects, disclosed is a mobile device for estimating a mass, the mobile device comprising: a vibration unit configured to vibrate the mobile device loaded with an object; a vibration sensor comprising an accelerometer and configured to measure a loaded vibration of the mobile device and the object from an accelerometer; a comparator coupled to the vibration sensor and configured to compare a tare vibration to the loaded vibration to result in a comparison, wherein the tare vibration comprises a measurement of a vibration of the mobile device unloaded with the object; and a determination unit configured to determine the mass from the comparison.

According to some aspects, disclosed is a mobile device for estimating a mass, the mobile device comprising: means for vibrating the mobile device loaded with an object; means for measuring a loaded vibration of the mobile device and the object comprising determining linear acceleration from an accelerometer, wherein the mobile device comprises the accelerometer; means for comparing a tare vibration to the loaded vibration to result in a comparison, wherein the tare vibration comprises a measurement of a vibration of the mobile device unloaded with the object; and means for determining the mass of the object from the comparison.

According to some aspects, disclosed is a non-transitory computer-readable storage medium including program code stored thereon for a mobile device to estimate a mass, comprising program code to: vibrate the mobile device loaded with an object; measure a loaded vibration of the mobile device and the object comprising program code to determine linear acceleration from an accelerometer, wherein the mobile device comprises the accelerometer; compare a tare vibration to the loaded vibration to result in a comparison, wherein the tare vibration comprises a measurement of a vibration of the mobile device unloaded with the object; and determine the mass from the comparison.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

Figure 1:
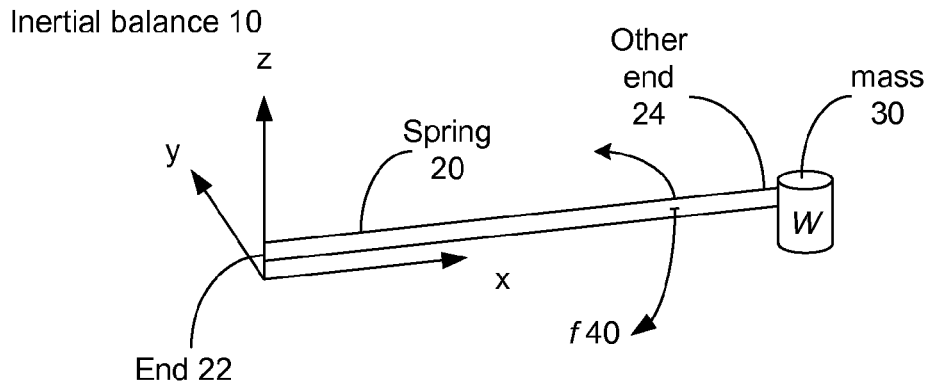
FIG. 1 shows an inertial balance.

FIG. 1 shows an inertial balance 10. An inertial balance 10 consists of a spring 20 (such as a hacksaw blade) fixed at one end 22. The other end 24 holds a mass W 30. The inertial balance 10 measures the mass W 30 by measuring the frequency of oscillations. The frequency f 40 of oscillation is a function of mass. The conversion between frequency and mass may be observed during calibration. Alternatively, Hooke's law may be where frequency f is independent of a spring's amplitude of oscillation and may be determined from only the mass m and the stiffness k as $$f = \frac{1}{2\pi}\sqrt{\frac{k}{m}}.$$

The inertial balance 10 may be calibrated using at least two known masses to determine a frequency of oscillation associated for each known mass. Then when measuring an unknown mass W 30, a frequency count may be interpolated or extrapolated to find the unknown mass from the calibration results.

Smartphones do not contain an inertial balance 10. Instead, a standard mobile device 100 often contains an eccentric motor 112 to vibrate the mobile device 100 and an accelerometer 122 to measure three-dimensional (3-D) linear acceleration of the mobile device 100. Using an eccentric motor 112 as a vibration unit 110 and an accelerometer 122 as a vibration sensor 120, a processor 140 may record and compare a tare weight to a loaded weight to determine an estimated mass of an object, in accordance with some embodiments of the present invention.

Figure 2:
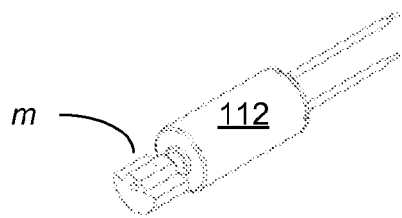
FIG. 2 shows an eccentric motor.

FIG. 2 shows an eccentric motor 112. An eccentric motor 112, also called an eccentric rotating mass vibrating motor (ERM), is typically used in a smartphone in "silent" mode. A smartphone includes a large display for displaying web pages and often includes one or more of a media player, camera and GPS navigation unit, high-resolution touch screen, web browser to display a web page, and Wi-Fi transceiver. Normally, a motor includes only balanced rotational elements, however, an eccentric motor 112 includes an eccentric weight that rotates offset from a center axis. The centripetal force of the offset mass m forces the eccentric motor 112 to become displaced. When the offset mass m rotates at approximately 60 Hz to 300 Hz, the displacement is perceived as a vibration. The rotation rate of some eccentric motors 112 may be adjusted by adjusting an input driving voltage. For example, a varying voltage level changes from a low level to a high level with a voltage generator or a frequency generator results in a sweeping frequency from a low rotation rate to a high rotation rate.

Figure 3:
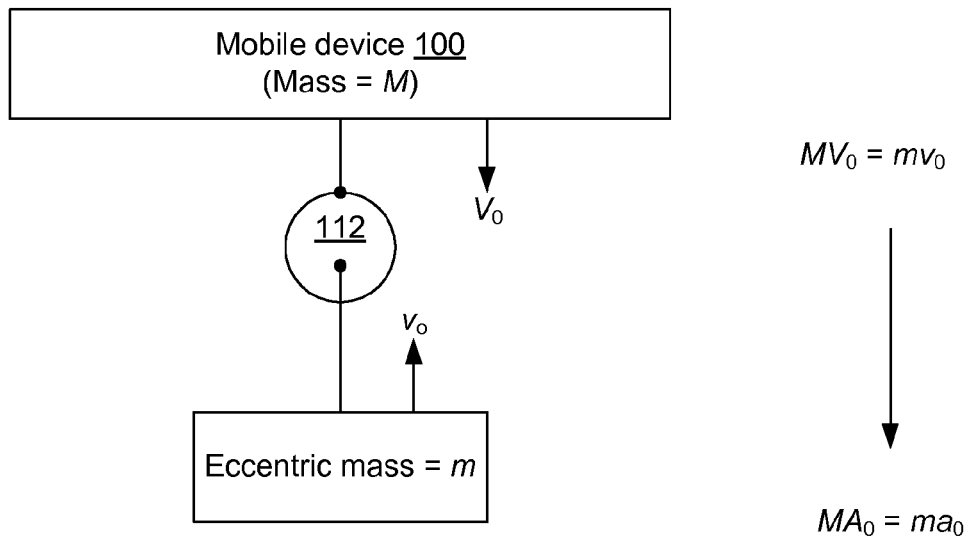
FIG. 3 models a mobile device with an eccentric motor, in accordance with some embodiments of the present invention.

FIG. 3 models a mobile device 100 with an eccentric motor 112, in accordance with some embodiments of the present invention. The mobile device 100 has mass M and the offset weight on the eccentric motor 112 has mass m. The mass of the mobile device 100 includes all but the mass m from the offset weight of the eccentric motor 112. According to Newton's third law of motion, the force $F_{100}$ caused by the mobile device 100 is equal and opposite from the force $F_{112}$ caused by the offset mass ($F_{100}=-F_{112}$), which may be written as $MV_0=mv_0$, with $V_0$ defined as the instantaneous velocity of the mobile device 100 and $v_0$ defined as the instantaneous velocity, in the opposite direction, of the eccentric mass. The velocity relationship ($MV_0=mv_0$) may be differentiated to form an acceleration relationship ($MA_0=ma$), where $A_0$ represents the acceleration of the mobile device 100 and a represents the acceleration, in the opposite direction, of the eccentric mass m. The figure includes no external weights to be measured, therefore, measuring acceleration in this system measures the mobile device 100 unloaded by an object 200 of an unknown external mass. The acceleration measurements may be used to calibrate the system by determining a zero-weight, tare weight or tare mass of the mobile device 100.

Figure 4:
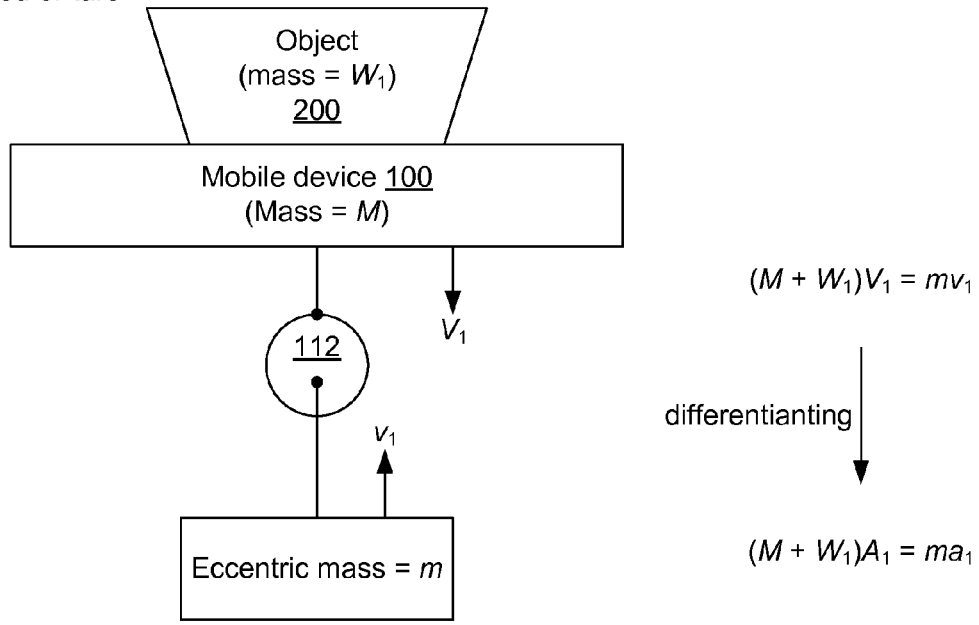
FIGS. 4 and 5 models a mobile device with an eccentric motor loaded with an object, in accordance with some embodiments of the present invention.
Figure 5:
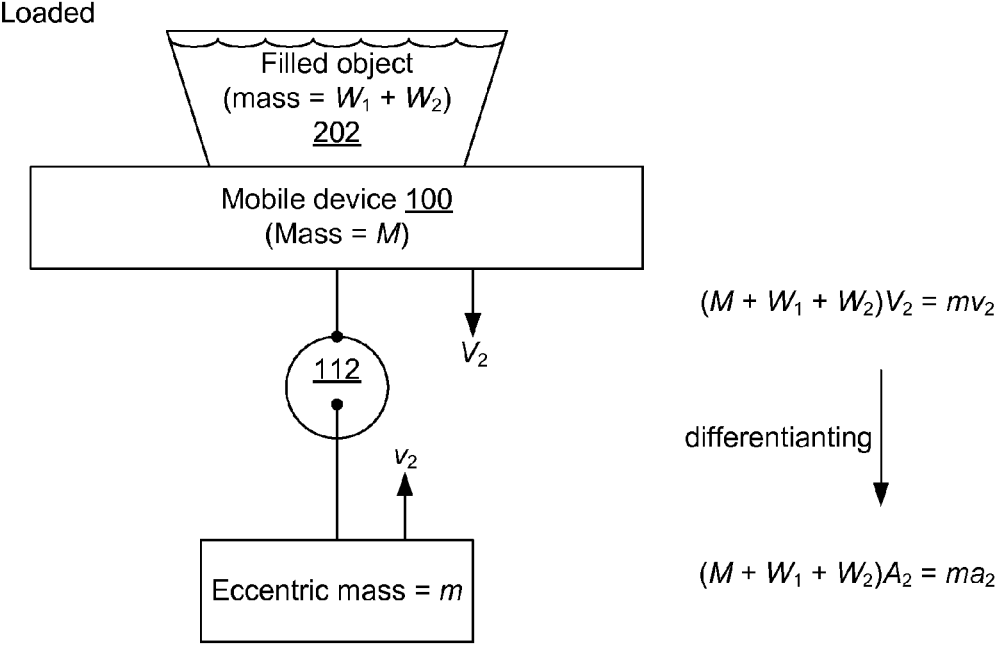

FIGS. 4 and 5 models a mobile device 100 with an eccentric motor 112 loaded with an object 200, in accordance with some embodiments of the present invention. In FIG. 4, the mobile device 100 of mass M with an eccentric motor 112 of offset mass m is shown. The mobile device 100 is loaded with an object 200 with mass $W_1$. Now the combined mass of the mobile device 100 and the object 200 work against the mass m of the eccentric motor 112. Assuming the mobile device 100 travels with the object 200, their velocities are equivalent ($V_1$). The combined system may be modeled as $(M+W_1)V_1=mv_1$. Now the loaded system includes a mass m of the eccentric motor 112 that travels at $v_1$ as opposed to in the unload system traveling at a velocity of $v_0$. The loaded velocity relationship may be differentiated to form a loaded acceleration relationship $\{(M+W_1)A_1=ma\}$ where $A_1$ represents the acceleration of the loaded mobile device 100 and a represents the acceleration of the mass m of the eccentric motor 112.

In FIG. 5, show a filled object 202. If the object 200 is an empty container, for example, of mass $W_1$, the system may be used as a zero weight, tare weight or tare mass of the system (shown in FIG. 4) by recalibrating and referencing the empty system with just loaded with the empty container to a filled system with the filled object 202. The combined mass of the empty system is $(M+W_1)$. When the object 200 is filled by mass $W_2$ to form filled object 202, a loaded mass $(M+W_1+W_2)$ may be compared with this tare mass $(M+W_1)$ to determine a mass $W_2$ of the contents. Applying Newton's law again, the loaded system represented by $\{(M+W_1+W_2)V_2=mv_2)\}$ may be differentiated to result in $\{(M+W_1+W_2)A_2=ma)\}$, where $A_2$ represents the acceleration of the loaded system and a represents the acceleration of the eccentric mass m of the eccentric motor 112.

In practice, acceleration rather than velocity is measured in a mobile device 100. For example, an accelerometer 122 measures an acceleration $A_0$ of the mobile device 100. Assuming the mobile device 100 is placed on a firm surface, the a acceleration of the eccentric mass m may be solved for with the equation $(MA_0=ma)$ as an unknown in terms of known quantities $(a=MA_0/m)$, where mass M of the mobile device 100 and mass m of the eccentric motor 112 are known a priori. The acceleration $A_0$ may be measured by the accelerometer 122, assuming the eccentric motor 112 is collocated with the accelerometer 122. If the mobile device 100 pivots or rotates with the eccentric motor 112, a gyroscope 124 may be used to account for the rotation, which may be removed from the accelerometer results. Therefore, an unloaded system may be calibrated by solving for acceleration a of the eccentric motor 112.

After loading with a mass $W_1$, the loaded system represented by equation $\{(M+W_1)A_1=ma\}$. The mass $W_1$ may be easily solved as $(W_1=ma/A_1-M)$, where masses m and M are known a priori, acceleration a was determined during calibration, and acceleration $A_1$ is measured by the accelerometer 122. If the object 200 is used as an empty container, the additional mass $W_2$ may be solve for from $\{(M+W_1+W_2)A_2=ma)\}$ as $(W_2=ma/A_2-M-W_1)$, where $A_2$ is current measured by the accelerometer 122 and $W_1$ is determined as described above.

Figures 6, 7:
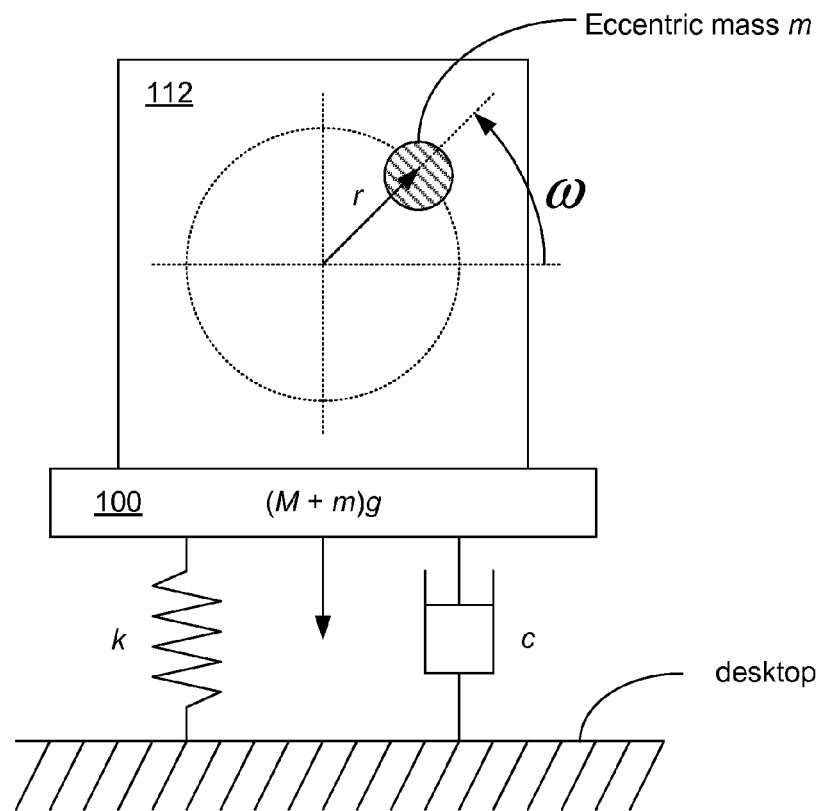
FIGS. 6 and 7 show a lumped model of an unloaded system, in accordance with some embodiments of the present invention.

FIGS. 6 and 7 show a lumped model of an unloaded system, in accordance with some embodiments of the present invention. As shown in FIG. 6, the model of the unloaded system includes a mass M of the mobile device 100, a mass m from the eccentric motor 112, a damping coefficient c, a Hooke's law of elasticity constant k, acceleration due to gravity g, a radius r representing how much the eccentric mass m is offset from a center axis, and an angular frequency $\omega$ of the eccentric motor 112. As shown in FIG. 7, the term listed above for the equality $(M+m)\ddot{x}+c\dot{x}+kx=(M+m)g+mr\omega^2 \cdot \sin(\omega t)$, where the inertial force is represented by $(M+m)\ddot{x}$, damping is represented by $c\dot{x}$, Hooke's law of elasticity is represented by $kx$, the force due to gravity is represented by $(M+m)g$, and the driving force of the eccentric motor 112 is represented by $mr\omega^2 \cdot \sin(\omega t)$, where $\ddot{x}$, $\dot{x}$, and x represent the acceleration, velocity and position, respectively, of the mobile device 100, and t represents time.

Instead of a vibration of a constant frequency, the eccentric motor 112 may sweep through a range of frequencies. By sweeping through a range of frequencies, a resonance frequency of a mobile device 100 may be determined. Each instance the mobile device 100 changes mass (e.g., from being unloaded to loaded), the resonance frequency changes. Specifically, the resonance frequency of the mobile device 100 decreases as the mass increases. Therefore, an unloaded mobile device 100 with mass M has a higher resonance frequency than a loaded mobile device 100 with mass $(M+W_1)$.

Figure 8:
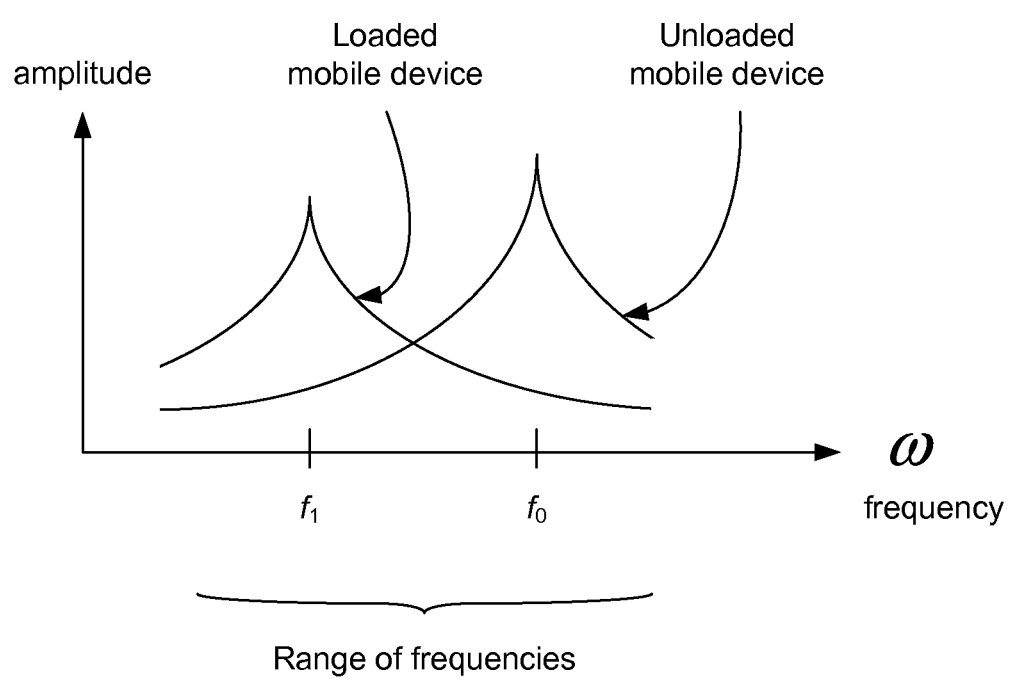
FIG. 8 plots frequency and amplitude to illustrate resonance frequencies for both an unloaded mobile device and a loaded mobile device, in accordance with some embodiments of the present invention.

FIG. 8 plots frequency and amplitude to illustrate resonance frequencies for both an unloaded mobile device and a loaded mobile device, in accordance with some embodiments of the present invention. When an unloaded mobile device 100, with mass M and an eccentric motor 112, sweeps through a range of frequencies, an amplitude of the vibration may be measured by the accelerometer 122. A frequency resulting in a peak measurement of the unloaded mobile device represents a resonance frequency $f_0$. When a loaded mobile device 100 of mass $(M+W_1)$ sweeps through the range of frequencies, a frequency resulting in a peak measurement of the loaded mobile device is a resonance frequency $f_1$. The resonance frequency $f_1$ of the loaded mobile device is lower that the resonance frequency $f_0$ of the unloaded mobile device. A difference in the resonance frequencies $(f_0-f_1)$ may be used as an indication of mass $W_1$. That is, the difference $(f_0-f_1)$ may be used as an index to a table or extrapolated/interpolated to determine the mass $W_1$.

Figure 9:
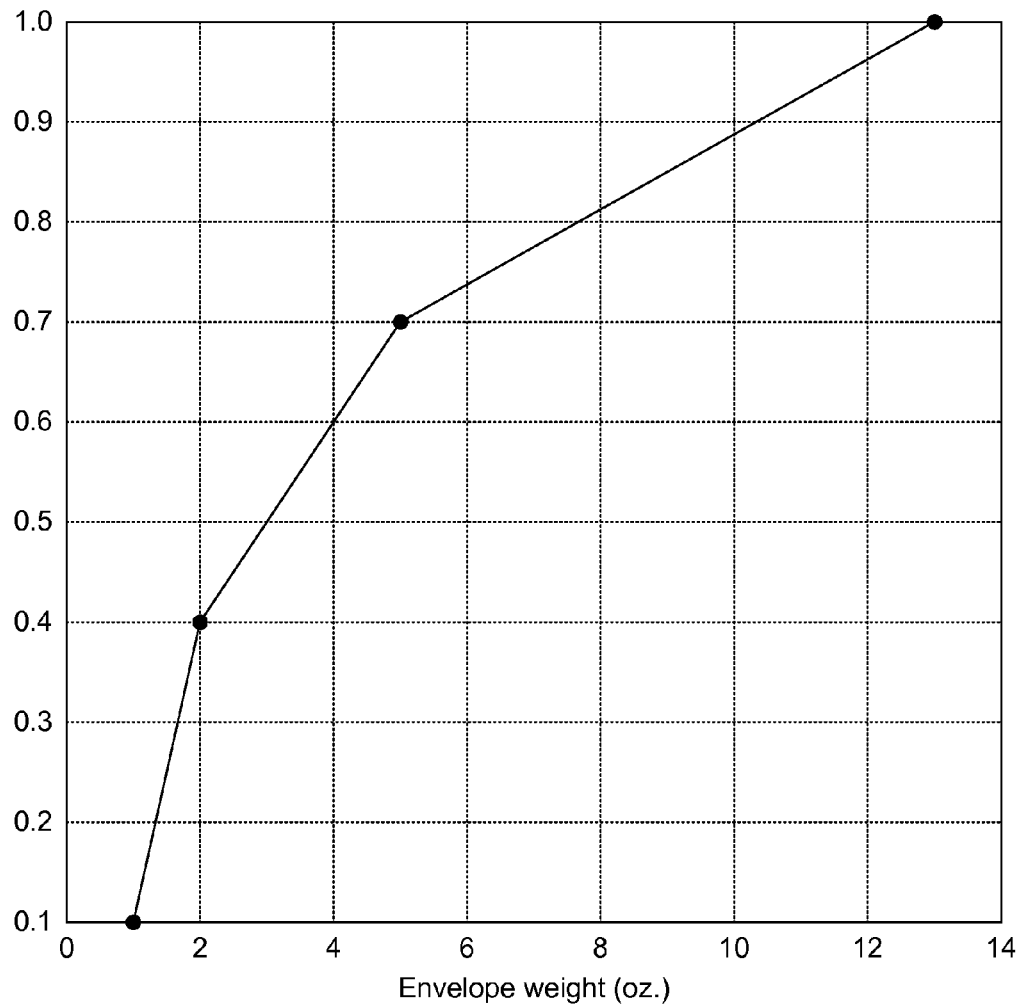
FIG. 9 charts a varying weight of an envelope and corresponding accelerations, in accordance with some embodiments of the present invention.

FIG. 9 charts a varying weight of an envelope and corresponding accelerations, in accordance with some embodiments of the present invention. With the experimental data, a magnitude of a change in acceleration (m/s$^2$) is plotted at varying points of envelope weight and a line connects these points. Acceleration was calculated as single acceleration a from a 3-D accelerometer from individual accelerators measurements $(a_x, a_y, a_z)$ from $a=\sqrt{a_x^2+a_y^2+a_z^2}$. An envelope acted as the object to be weighed. In some situation, an interposer is desirable between the object to be measured and a smartphone. For example, a common empty paper or plastic cup can act as an interposer between a smartphone and the envelope. Generally, any suitable object may be used as an interposer. If the resolution of the mass of the object to be weighed is comparable to the mass of the interposer, the system may be calibrated to account for the interposer.

The interposer may help to: (a) avoid blocking a view to the smartphone display; and (b) prevent sagging (such as from an envelope) of the object to be weighed from touching a surface near the smartphone. The envelope was placed on top of the empty paper cup, which was placed on the screen of the smartphone. A plastic cup or a Styrofoam cup may substitute for a paper cup. In the case when an interposer is employed, the calibration or tarring procedure accounts for the interposer mass.

Figure 10:
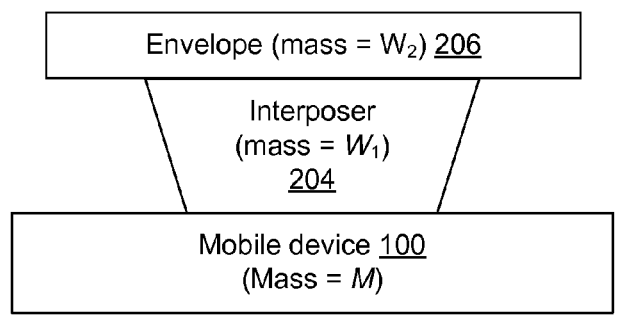
FIG. 10 shows an interposer in position between a mobile device and an object, in accordance with some embodiments of the present invention.

FIG. 10 shows an interposer in position between a mobile device and an object, in accordance with some embodiments of the present invention. The figure illustrates sensitivity of the accelerometer to different weights of the envelope. Extrapolation shows the smartphone used in this experiment was sensitive to more than 16 ounces (oz.) and extremely sensitive for objects weighing less than 5 oz.

Figure 11:
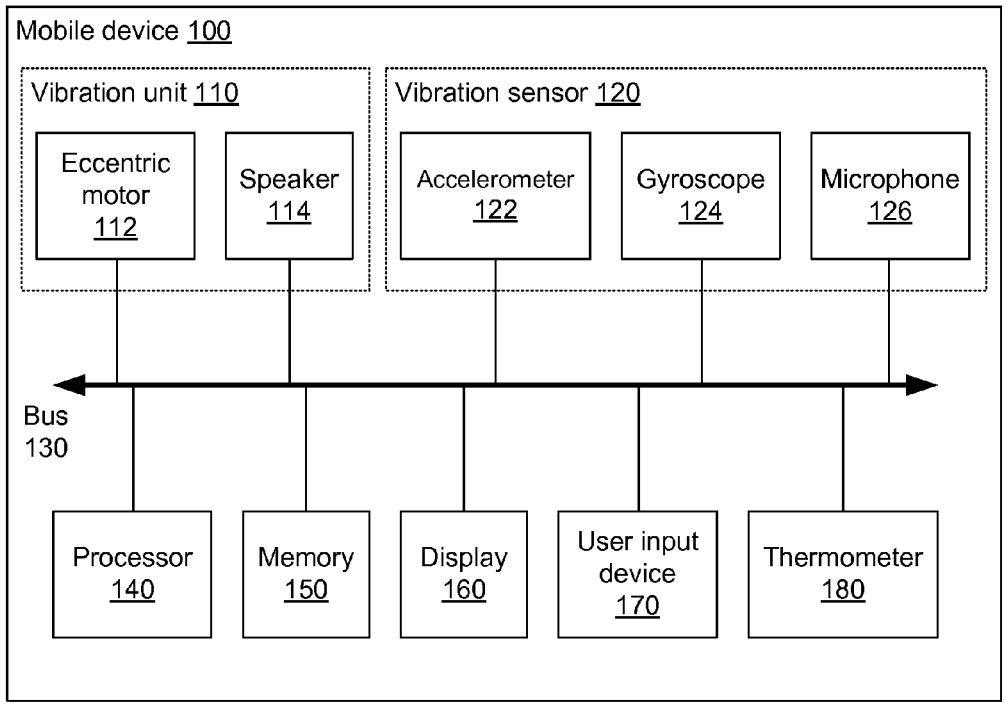
FIGS. 11 and 12 show a mobile device, in accordance with some embodiments of the present invention.
Figure 12:
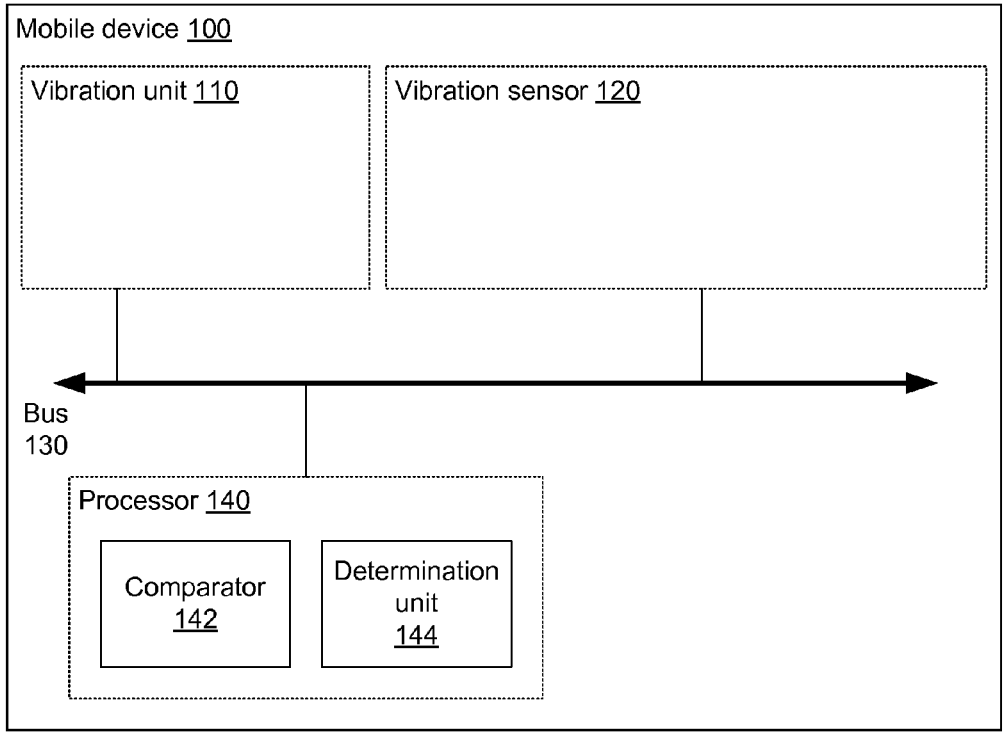

FIGS. 11 and 12 show a mobile device 100, in accordance with some embodiments of the present invention. In FIG. 11, the mobile device 100 includes an eccentric motor 112, a speaker 114, an accelerometer 122, a gyroscope 124, a microphone 126, a processor 140, memory 150, a display 160, a user input device 170 and a thermometer 180 connected together with a bus 130. Either or both of the eccentric motor 112 and the speaker 114 may be used as a vibration unit 110. For example, the speaker 114 may be used to generate a sound to vibrate the mobile device 100. The accelerometer 122 and/or the gyroscope 124 and/or the microphone 126 may be used as a vibration sensor 120. For example, the microphone 126 may be used to measure an amplitude signal caused by the vibration unit 110.

In order to simplify the description above, reference has been made to an accelerometer and gyroscope, each in a singular sense. In practice, a smartphone has a three-dimensional accelerometer also referred to as three accelerometers with mutually orthogonal sensitive axes, often referred to as a 3-D accelerometer, or just an accelerometer, having an X-axis accelerometer, Y-axis accelerometer and Z-axis accelerometer. Similarly, a smartphone also has a 3-D gyroscope also referred to as three gyroscopes with mutually orthogonal sensitive axes, often referred to as a 3-D gyroscope having an X-axis gyroscope, Y-axis gyroscope and Z-axis gyroscope.

For simplicity, signal processing described above refers to both a single-axis accelerometer (e.g., Z-axis accelerometer) and a single-axis gyroscope (e.g., X-axis gyroscope). Similarly, a 3-D accelerometer and a 3-D gyroscope may be used, which together provide 6 degrees of freedom as represented by an array of inertial sensor measurements.

In FIG. 12, a mobile device 100 contains a vibration unit 110, a vibration sensor 120 and a processor 140 connected by a bus 130. The processor 140 includes software modules or code to form a comparator 142 and a determination unit 144. The vibration unit 110 is configured to vibrate the mobile device 100 when loaded with an object 200. The vibration unit 110 may also be configured to vibrate the mobile device 100 when unloaded, for example, during calibration. Alternatively, a calibration value may be stored in the mobile device 100 at the factory. The vibration sensor 120 is configured to measure a loaded vibration of the mobile device 100 and the object 200. Also, the vibration sensor 120 may be configured to measure an unloaded or tare vibration of the mobile device 100 alone. The comparator 142 is coupled to the vibration sensor 120 and configured to compare the tare vibration to the loaded vibration to result in a comparison. The comparison may be a difference in amplitudes or a difference in resonance frequencies. The determination unit 144 is configured to determine the mass from the comparison. For example, the determination unit 144 interpolates, extrapolates and/or looks up a mass based on the difference from the comparison.

Figure 13:
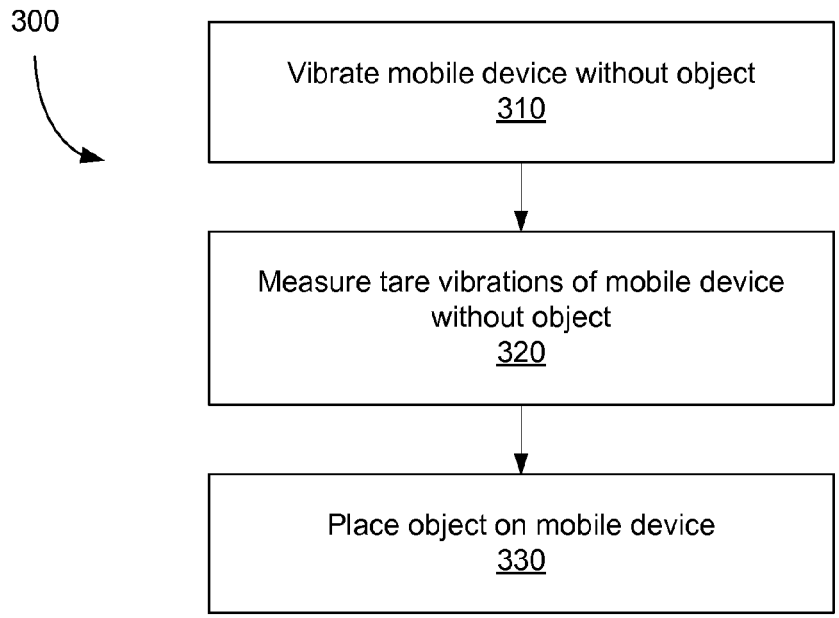
FIGS. 13 and 14 show a method, in accordance with some embodiments of the present invention.
Figure 14:
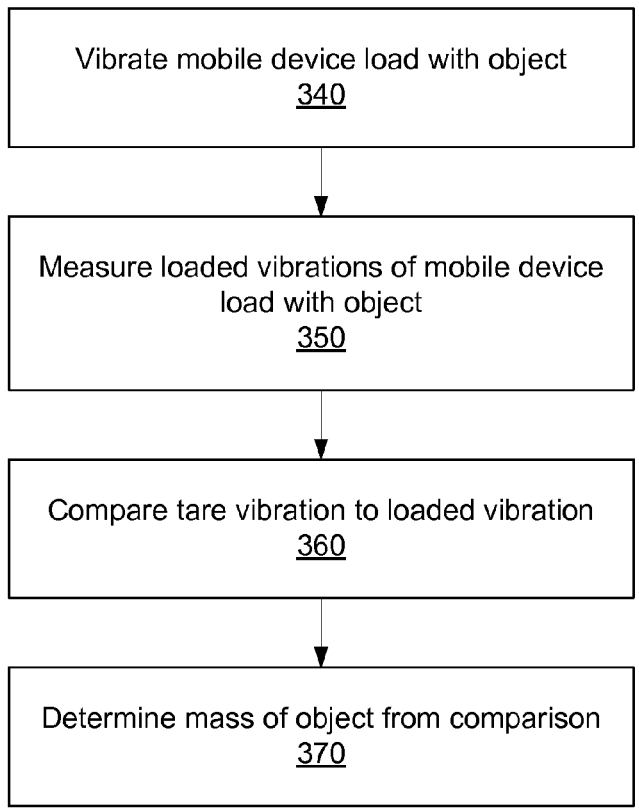

FIGS. 13 and 14 show a method 300, in accordance with some embodiments of the present invention. The first figure shows a calibration process without an object 200 and the second figure shows a process loaded with the object 200 having a mass $W_1$. In FIG. 13 at 310, a processor 140 causes a vibration unit 110 to vibrate the mobile device 100. At this point the mobile device 100 is unloaded without the object 200. At 320, the processor 140 causes a vibration sensor 120 to measure an unloaded or tare vibration of the mobile device 100 with the object 200. This tare vibration is a calibration of the mobile device 100 unloaded with the object 200. At 330, a user places the object 200 on the mobile device 100.

In FIG. 14 at 340, the processor 140 causes the vibration unit 110 to vibrate the mobile device 100 loaded with the object 200. At 350, the processor 140 causes the vibration sensor 120 to measure the loaded vibration of the mobile device 100 loaded with the object 200. At 360, the processor 140 uses a comparator 142 to compare the tare vibration to the loaded vibration. For example, the processor 140 compares a difference in amplitudes or frequencies to form a comparison result. At 370, the processor 140 uses a determination unit 144 to determine the mass from the comparison result.

The processor 140 may adjust the acceleration measurements according to a specific calibration curve. The acceleration measurements may be amplified more or less depending on the calibration curve. Calibration curves account for ambient temperature measured by the thermometer 180, the angular acceleration measurements from the gyroscope 124, the position of the vibration unit 110 relative to the vibration sensor 120, the casing around the mobile device 100, the surface on with the mobile device 100 is at rest, and the type of object 200 being weighted. A calibration curve may be customized to a category of devices, a particular device model or a certain individual device. A calibration curve may be set for an average temperature or may be a function of temperature.

For example, a casing around the mobile device 100 with a hardcover requires less adjustment than a softcover. A user may be prompted to enter the type or state of object 200 (e.g., solid, liquid or powder), the type casing (e.g., soft, hard or no casing), and/or a type of surface on which the mobile device 100 is placed. In some embodiments, the user is instructed where on a surface of a display 160 to place the object 200. That is, the processor 140 draws a target area for placing the object 200 or interposer on a display 160 of the mobile device 100.

In some embodiments, vibrating the mobile device 100 loaded with the object 200 includes repeatedly activating and deactivating an eccentric motor 112 inside the mobile device 100 to form a pulse-width modulation (PWM).

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device for estimating a mass, the method comprising:
    vibrating the mobile device loaded with an object;
    measuring a loaded vibration of the mobile device and the object comprising determining linear acceleration from an accelerometer, wherein the mobile device comprises the accelerometer;
    comparing a tare vibration to the loaded vibration to result in a comparison, wherein the tare vibration comprises a measurement of a vibration of the mobile device unloaded with the object; and
    determining the mass of the object from the comparison.

2. The method of claim 1, further comprising:
    vibrating the mobile device without the object; and
    measuring the tare vibration without the object.

3. The method of claim 1, further comprising placing the object on a display of the mobile device.

4. The method of claim 1, further comprising placing an interposer between the object and the mobile device.

5. The method of claim 1, wherein comparing the tare vibration to the loaded vibration compares resonance frequencies.

6. The method of claim 1, wherein determining the mass from the comparison further comprises determining factoring in a temperature of the mobile device measured from a thermometer, wherein the mobile device comprises the thermometer.

7. The method of claim 1, further comprising:
    receiving a state of the object;
    wherein determining the mass from the comparison is further based on the state of the object.

8. The method of claim 7, wherein the state of the object is one of a solid, a liquid and a powder.

9. The method of claim 1, wherein vibrating the mobile device loaded with the object comprises sweeping an excitation frequency.

10. The method of claim 9, further comprising determining a loaded resonance frequency of the mobile device loaded with the object.

11. The method of claim 10, wherein comparing the tare vibration to the loaded vibration to result in the comparison comprises comparing a tare resonance frequency of the mobile device without the object to the loaded resonance frequency of the mobile device loaded with the object.

12. A mobile device for estimating a mass, the mobile device comprising:
    a vibration unit configured to vibrate the mobile device loaded with an object;
    a vibration sensor comprising an accelerometer and configured to measure a loaded vibration of the mobile device and the object from the accelerometer;
    a comparator coupled to the vibration sensor and configured to compare a tare vibration to the loaded vibration to result in a comparison, wherein the tare vibration comprises a measurement of a vibration of the mobile device unloaded with the object; and
    a determination unit configured to determine the mass from the comparison.

13. The mobile device of claim 12, wherein the determination unit is configured to determine the mass from the comparison and a state of the object.

14. The mobile device of claim 12, wherein the vibration unit comprises a variable frequency generator.

15. The mobile device of claim 12, wherein the vibration unit comprises a variable voltage generator.

16. The mobile device of claim 12, wherein the vibration sensor further comprises a gyroscope.

17. The mobile device of claim 12, further comprising:
    a thermometer to provide a temperature and coupled to the determination unit;
    wherein the determination unit is configured to determine the mass from the comparison and the temperature.

18. The mobile device of claim 12, further comprising a display coupled to the determination unit and configured to display the mass as a weight.

19. The mobile device of claim 18, wherein the display is further configured to display a target area for placing the object on the mobile device.

20. A mobile device for estimating a mass, the mobile device comprising:
    means for vibrating the mobile device loaded with an object;
    means for measuring a loaded vibration of the mobile device and the object comprising determining linear acceleration from an accelerometer, wherein the mobile device comprises the accelerometer;
    means for comparing a tare vibration to the loaded vibration to result in a comparison, wherein the tare vibration comprises a measurement of a vibration of the mobile device unloaded with the object; and
    means for determining the mass of the object from the comparison.

21. The mobile device of claim 20, further comprising:
    means for vibrating the mobile device without the object; and
    means for measuring the tare vibration without the object.

22. The mobile device of claim 20, further comprising means for displaying a target area for placing the object on the mobile device.

23. The mobile device of claim 20, further comprising:
    means for receiving a state of the object;
    wherein the means for determining the mass from the comparison is further based on the state of the object.

24. The mobile device of claim 20, wherein the means for vibrating the mobile device loaded with the object comprises means for supplying a sweeping frequency.

25. The mobile device of claim 24, further comprising determining a loaded resonance frequency of the mobile device loaded with the object.

26. A non-transitory computer-readable storage medium including program code stored thereon for a mobile device to estimate a mass, comprising program code to:
    vibrate the mobile device loaded with an object;
    measure a loaded vibration of the mobile device and the object comprising program code to determine linear acceleration from an accelerometer, wherein the mobile device comprises the accelerometer;

compare a tare vibration to the loaded vibration to result in a comparison, wherein the tare vibration comprises a measurement of a vibration of the mobile device unloaded with the object; and determine the mass from the comparison.

27. The non-transitory computer-readable storage medium of claim 26, further comprising program code to:

vibrating the mobile device without the object; and measuring the tare vibration without the object.

28. The non-transitory computer-readable storage medium of claim 26, further comprising program code to display a target area for placing the object on the mobile device.

29. The non-transitory computer-readable storage medium of claim 26, further comprising program code to:

receive a state of the object;

wherein the program code to determine the mass from the comparison is further based on the state of the object.

30. The non-transitory computer-readable storage medium of claim 26, wherein the program code to vibrate the mobile device loaded with the object comprises program code to sweep an excitation frequency.

\* \* \* \* \*